(12) United States Patent
Angstmann et al.

(10) Patent No.: US 12,297,910 B2
(45) Date of Patent: May 13, 2025

(54) SEALS FOR MULTI-SURFACE SEALING

(71) Applicant: Kinetic Pressure Control Ltd., Houston, TX (US)

(72) Inventors: Steven A. Angstmann, Houston, TX (US); Bobby J. Gallagher, Houston, TX (US); Billy J. Gallagher, Houston, TX (US); Sean Laird, Houston, TX (US)

(73) Assignee: Kinetic Pressure Control Ltd., Houston, TX (US)

( * ) Notice: Subject to any disclaimer, the term of this patent is extended or adjusted under 35 U.S.C. 154(b) by 52 days.

(21) Appl. No.: 17/789,208

(22) PCT Filed: Jan. 6, 2021

(86) PCT No.: PCT/US2021/012331
§ 371 (c)(1),
(2) Date: Jun. 26, 2022

(87) PCT Pub. No.: WO2021/142004
PCT Pub. Date: Jul. 15, 2021

(65) Prior Publication Data
US 2023/0036957 A1    Feb. 2, 2023

Related U.S. Application Data

(60) Provisional application No. 62/957,896, filed on Jan. 7, 2020.

(51) Int. Cl.
*F16J 15/46* (2006.01)
*F16J 15/3232* (2016.01)
*F16J 15/3252* (2016.01)

(52) U.S. Cl.
CPC .......... *F16J 15/46* (2013.01); *F16J 15/3232* (2013.01); *F16J 15/3252* (2013.01)

(58) Field of Classification Search
CPC .... F16J 15/00; F16J 15/46; F16J 15/48; F16J 15/32; F16J 15/3232; F16J 15/3236;
(Continued)

(56) References Cited

U.S. PATENT DOCUMENTS 2,769,648 A * 11/1956 Herman ............... F16L 23/10
277/626
2,841,429 A * 7/1958 McCuistion ......... F16J 15/3236
277/587

(Continued)

FOREIGN PATENT DOCUMENTS

DE    102007012881 A1 *  6/2008  .............. F16J 15/46
WO    WO-2019044115 A1 *  3/2019  .............. B60T 11/22

OTHER PUBLICATIONS

International Search Report and Written Opinion of the International Searching Authority, International Application No. PCT/US2021/012331, dated Mar. 10, 2021.

*Primary Examiner* — Nathan Cumar
(74) *Attorney, Agent, or Firm* — Victor H. Segura

(57) ABSTRACT

A seal includes a seal body formed as a closed loop. The seal body having an upper surface and a lower surface. The seal body comprises an inner wall and an outer wall. The lower surface comprises an inner wing and an outer wing extending laterally from the outer surface to provide lateral sealing. The upper surface of the seal is configured to provide a sealing contact when the seal is urged into engagement via a fluid pressure.

25 Claims, 5 Drawing Sheets

(58) Field of Classification Search
CPC .. F16J 15/3248; F16J 15/3252; F16J 15/3256; F16J 15/326; F16J 15/3264
USPC ........................................................ 277/558
See application file for complete search history.

(56) References Cited

U.S. PATENT DOCUMENTS

| | | |
|---|---|---|
| 2002/0162981 A1 | 11/2002 | Berckenhoff et al. |
| 2004/0021102 A1 | 2/2004 | Berckenhoff et al. |
| 2008/0017814 A1* | 1/2008 | Berckenhoff ......... E21B 33/061 |
| | | 251/1.3 |
| 2010/0181761 A1 | 7/2010 | Santi et al. |
| 2012/0193874 A1 | 8/2012 | Varco |
| 2013/0234401 A1* | 9/2013 | Smith .................... F16J 15/166 |
| | | 277/512 |
| 2014/0060805 A1* | 3/2014 | Campbell ............... E21B 33/04 |
| | | 166/75.11 |
| 2018/0080300 A1 | 3/2018 | Angstmann et al. |

* cited by examiner

SEALS FOR MULTI-SURFACE SEALING

CROSS REFERENCE TO RELATED APPLICATIONS

Continuation of International Application No. PCT/US2021/012331 filed on Jan. 6, 2021. Priority is claimed from U.S. Provisional Application No. 62/957,896 filed on Jan. 7, 2020. Both foregoing applications are incorporated herein by reference in their entirety.

BACKGROUND

This disclosure relates to seals that provide simultaneous sealing at multiple seal surfaces. More specifically, the present disclosure relates to seals that interact with gases and activation pressures to provide simultaneous sealing about seal inner diameter (ID), outer diameter (OD), and face surfaces.

Seals, such as elastomer seals, are used to stop passage of fluid between components placed in proximity A well-known type of seal is an O-ring, which may be disposed in a groove or channel formed on one of the components and compressively engaged with the other component. In such use, the O-ring may be disposed in an annular space between, for example, nested cylinders or other correspondingly shaped components.

Seals may also be needed to stop fluid passage between one component having a groove or channel to hold the seal, and a flat surface on the proximate component. In some cases, the components may require the ability to move laterally with respect to each other, while maintaining a fluid tight seal and avoiding damage to the seal. There is a need for improved seals for use in such applications.

SUMMARY

One aspect of the present disclosure is a seal including a seal body. The seal body is formed as a closed loop, having an upper surface and a lower surface. The seal body comprises an inner wall and an outer wall. The lower surface comprises an inner wing and an outer wing extending laterally from the outer surface, the wings configured to provide lateral sealing surfaces. The upper surface comprises at least one raised portion configured to provide a sealing surface. At least one of the inner wall and the outer wall comprises a relief, and a reinforcement is disposed in the relief.

In some embodiments, the reinforcement is made from a material having a lower resilience than a material used to form the seal body.

In some embodiments, the reinforcement comprises a toroid.

In some embodiments, the reinforcement comprises metal.

In some embodiments, the reinforcement comprises a spring.

In some embodiments, the inner and outer wall each comprise a relief, with a reinforcement disposed in each relief.

In some embodiments, the seal body comprises an elastomer.

Some embodiments further comprise at least one reinforcement disposed in the seal body.

In some embodiments, the at least one reinforcement disposed in the seal body comprises a ring or an annular spring.

Some embodiments further comprise two reinforcements disposed in the seal body.

Some embodiments further comprise a recess between the inner and outer wing.

Some embodiments further comprise an O-ring disposed in the recess.

In some embodiments, the seal is disposed in a channel in a first component, and a second component is disposed near the seal and the channel to define a passage between the first component and the second component.

In some embodiments, the passage is configured to receive a fluid under pressure.

In some embodiments, the inner wing is urged into contact with a first wall of the channel and the outer wing is urged into contact with a second wall of the channel.

In some embodiments, the channel is in fluid communication with a source of fluid pressure.

In some embodiments, the channel comprises a deviated edge to communicate fluid pressure in the passage to the channel.

In some embodiments, the channel is in fluid communication with a chamber configured to contain a pressurized fluid therein.

A method for sealing between a first component and a second component according to another aspect of this disclosure includes disposing a seal in a channel formed in the first component. The seal comprises a seal body formed as a closed loop. The seal body has an upper surface and a lower surface. The seal body comprises an inner wall and an outer wall, wherein the lower surface comprises an inner wing and an outer wing extending laterally from the outer surface to contact a corresponding wall of the channel to provide lateral sealing. The upper surface comprises at least one raised portion to contact a surface on the second component to provide a sealing surface. Fluid pressure is applied to a space between the channel and the seal so as to urge the upper seal surface into sealing contact with a surface on the second component.

In some embodiments, applying fluid pressure comprises applying the pressure to a passage defined between the first and second component so that pressure passes by at least one of the inner and the outer wing to charge the space between the seal and the channel.

In some embodiments, the channel comprises a deviated edge to enable passage of the fluid pressure past the at least one of the inner wing and the outer wing.

In some embodiments, the channel is in fluid communication with a chamber configured to contain a pressurized fluid therein.

In some embodiments, the passage is configured to receive a pressurized fluid originating from an actuated charge.

In some embodiments, at least one of the inner and outer wall comprises a relief, with a reinforcement disposed in the relief.

In some embodiments, the seal comprises at least one reinforcement disposed in the seal body.

Other aspects and possible advantages will be apparent from the description and claims that follow.

DETAILED DESCRIPTION

Figure 1A:
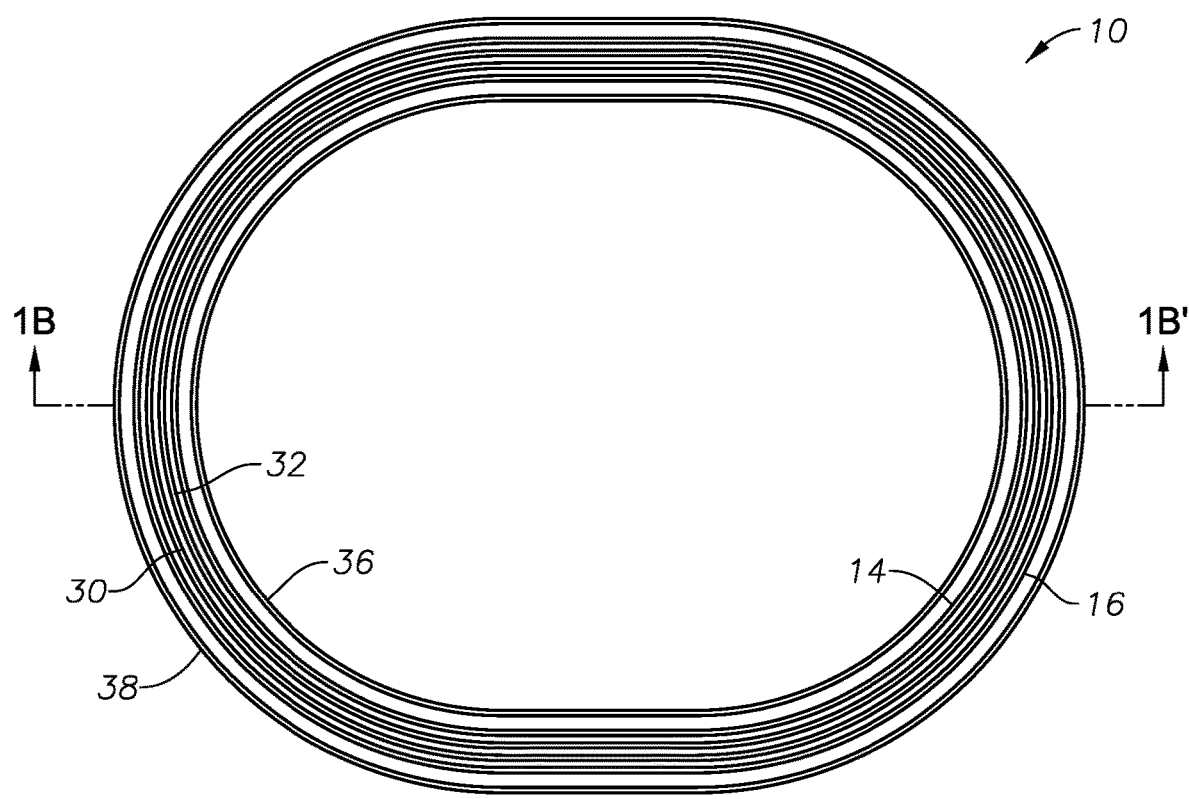
FIG. 1A shows a plan view of an example embodiment of a seal according to this disclosure.
Figure 1B:
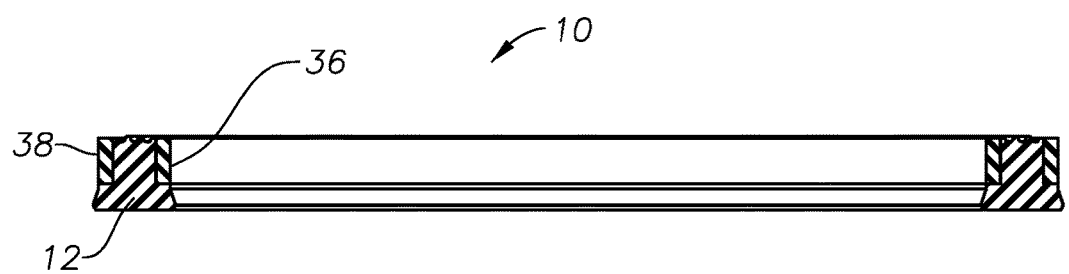
FIG. 1B shows a cross-section of the uninstalled seal along section line 1B-1B' in FIG. 1A.

FIG. 1A shows a plan view of an example embodiment of a seal according to this disclosure. The seal 10 may be shaped as an annular ring. The embodiment in FIG. 1A may have an oval or "racetrack" configuration. Embodiments of the seal 10 can be implemented with various dimensions along either or both the major axis and the minor axis (e.g., some embodiments may also be implemented in circular configuration). It will be appreciated by those skilled in the art that the seal 10 according to this disclosure may be formed from conventional materials suitable for the desired application as known in the art (e.g., resilient materials: elastomers: rubber compounds, synthetic elastomeric materials; or composites, etc.). FIG. 1B shows a cross-section of the seal 10 along section line 1B-1B' in FIG. 1A. The seal 10 includes a centrally disposed body 12, which can vary in height (thickness) depending on the desired application for the seal 10.

Figure 1C:
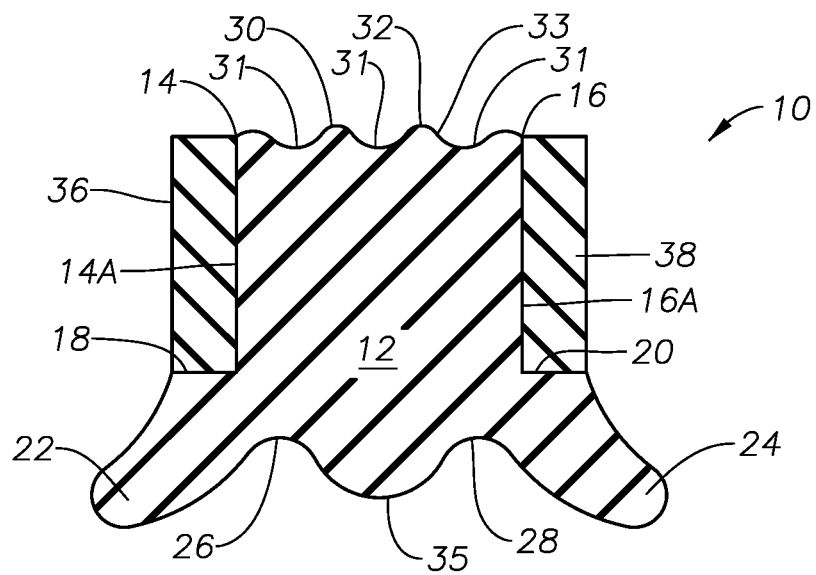
FIG. 1C shows an enlarged view of a cross-section of the seal indicated in detail B of FIG. 1B.

FIG. 1C shows an enlarged view of a cross-section of the seal 10 indicated in detail B of FIG. 1B. One side of the seal 10 forms an inner diameter wall 14 (inner side) and the opposite side forms the exterior diameter wall 16 (outer side). The positions of the respective walls 14, 16 with reference to the seal 10 are shown in FIG. 1A. Each wall 14, 16 extends from the top surface 33 of the seal 10 toward the bottom surface 35 of the seal 10, forming a smooth annular surface. The lower section of each wall 14, 16 may extend outward, respectively, forming an inner ledge or shoulder 18 and an outer ledge or shoulder 20. Below the inner shoulder 18, the lower body portion of the seal 10 defines a sloping surface extending outward (laterally) from the body 12 of the seal 10 to form an inner wing 22. Similarly, the lower body portion of the seal 10 extending from the outer shoulder 20 defines a sloping surface extending outward (laterally) from the body 12 of the seal 10 to form an outer wing 24. The bottom surface 35 of the seal 10 may comprise a pair of concentric (with reference to the entire seal 10) recesses or grooves 26, 28 extending along the entire loop of the seal, shown in FIG. 1C as an indentation or recess adjacent to each wing 22, 24. The recesses or grooves 26, 28 enable each wing 22, 24 to have flexibility to spread outward or compress inward (laterally) depending on the forces applied to the seal 10 (such forces further described below). A tip of each wing 22, 24 may be shaped to provide effective sealing with minimal surface contact area of each wing with respect to a surface to which the wings 22, 24 are intended to seal, as further explained herein.

In some embodiments, the seal 10 includes one or more raised portions 30, 32 extending from the upper seal surface 33. Each raised portion 30, 32 may be formed as a ring extending along the entire loop of the upper seal surface 33. Example positions of the raised portions 30, 32 with reference to the entire seal 10 are shown in FIG. 1A. In some embodiments, the upper surface 33 may also be configured with corresponding recessed portions 31 formed as grooves, recesses or trenches running along the entire loop of the upper surface 33. When the seal 10 is installed in an application wherein the raised portions 30, 32 contact another surface in a compressive sealing engagement (e.g., see FIG. 3), the recessed portions 31 provide space for the material of the raised portions 30, 32 to be compressed and displaced.

An inner element 36, e.g., a structural reinforcement, is disposed in a relief 14A formed on the inner circumference of the seal 10. The inner element 36 is configured to abut against the surface of the inner wall 14, its upper end being flush with the top edge of the seal 10 wall and disposed on the inner shoulder 18 at its lower end. An outer element 38, e.g., a structural reinforcement, is fitted over the seal 10 in a relief 16A formed on the outer circumference, its upper end being flush with the upper surface 33 and disposed on the outer shoulder 20 at its lower end. In some embodiments, the upper end of the inner 36 and/or outer 38 elements may be slightly recessed from the upper surface 33. "Upper" and "lower" as used in this description mean only the orientation with reference to the drawing figures and are not intended to limit the physical orientation of the seal 10 in any application for the seal 10. The inner and outer elements 36, 38 may each comprise a solid annular ring or a spring (e.g., shaped as a toroid) respectively sized to conform to the ID and OD of the body 12 (See FIG. 1B). The elements 36, 38 may be formed from conventional materials suitable for the desired application as known in the art. In some embodiments, the inner and/or outer elements 36, 38 may be formed from harder or more rigid materials (e.g., metal, hard thermoplastic, etc.) than the material used to form the seal body 12. The inner and outer elements 36, 38 may be affixed to the seal body 12 by any suitable means as known in the art (e.g., heat fusing, adhesives, interference fit, etc.). In some embodiments, the elements 36, 38 may be molded into the seal body 12 using manufacturing techniques as known in the art.

Figure 2:
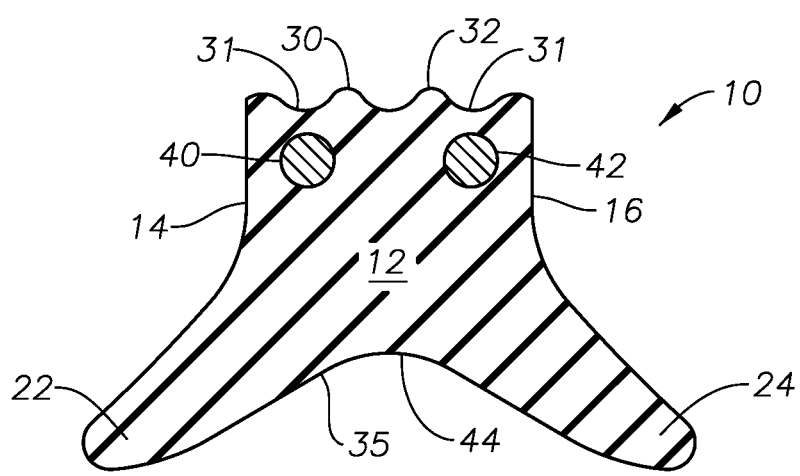
FIG. 2 shows a cross-section of another embodiment of a seal.

FIG. 2 shows a cross-section of another embodiment of a seal 10 according this disclosure. The seal 10 may comprise a pair of rings 40, 42 embedded within the seal body 12. The rings 40 are disposed near the upper surface of the seal 10, with one ring 40 placed close to the inner wall 14 and the other ring 42 placed close the outer wall 16. The rings 40, 42 may be formed from a less resilient material than the seal body 12 such as metal or hard plastic and may be formed as a one-piece or multi-piece loop extending along the entire loop of the seal 10. In some embodiments, the rings 40, 42 comprise metallic springs, e.g., made from spring metal such as phosphor bronze. The rings 40, 42 may be molded within the seal 10 during fabrication of the seal 10 in any manner known in the art. The rings 40, 42 may provide additional structural support to the seal 10 and may provide resistance to seal extrusion in certain implementations (further described below). The bottom surface 35 of the seal 10 may be configured with a single groove 44 running along the entire loop of the seal, depicted as an indentation or recess disposed symmetrically between the wings 22, 24.

Figure 3:
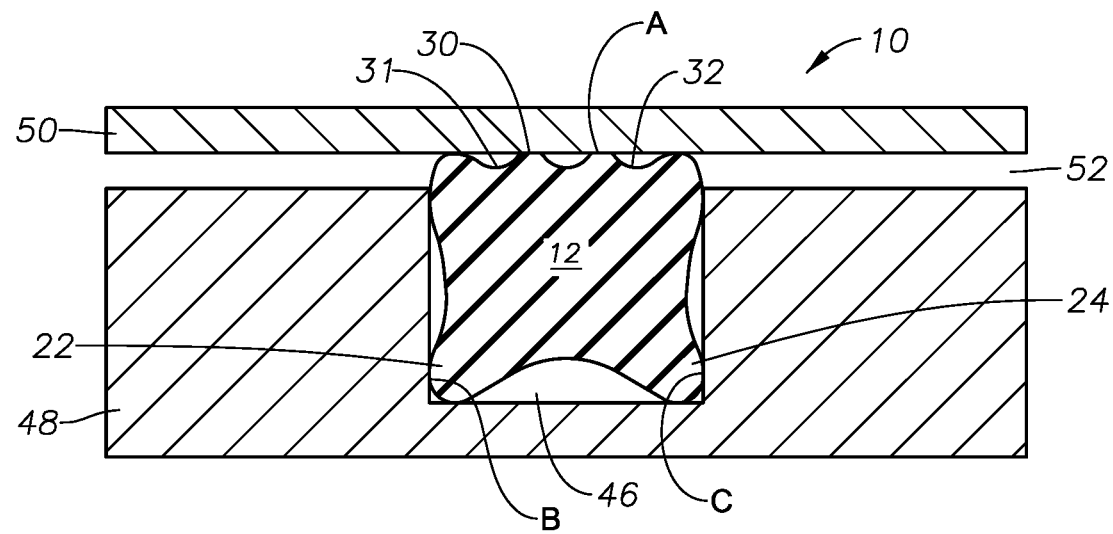
FIG. 3 shows an embodiment of a seal according to this disclosure installed in sealing engagement in an intended use of the seal.

FIG. 3 shows an embodiment of a seal 10 according to this disclosure installed in sealing engagement in an intended use of the seal 10. FIG. 3 shows a cross-section of the seal 10 corresponding to the cross section of FIG. 1C as installed within a seal groove or channel 46 formed in a first component 48. The seal 10 is shown compressed between the first component 48 and a second component 50. The first 48 and second 50 components represent an article of manufacture with the components disposed close to one another yet providing a passage, orifice, or separation 52 otherwise allowing fluid (e.g., liquid and/or gas) flow in either direction absent the presence of the seal 10 as shown. It will be appreciated that such a configuration to seal such as passage is well known in articles of manufacture. As installed, the seal 10 is compressed within the channel 46 such that the top surface of the seal 10 contacts the second component 50. The one or more raised portions 30, 32 on the seal 10 are compressed against the second component 50 surface, forming a sealing face engagement. The inner 22 and outer 24 wing sections respectively spread outward from the center of the seal body 12, forming a radial sealing engagement B, C against the side walls of the groove or channel 46. As shown in FIG. 3, the seal 10 provides face A and radial B, C sealing against fluid passage along the separation 52. Although shown in a cross-sectional view in FIG. 3, it will be appreciated that the seal 10 is formed as an annular ring or loop in its entirety, similar to what is shown in FIG. 1A.

Figure 4:
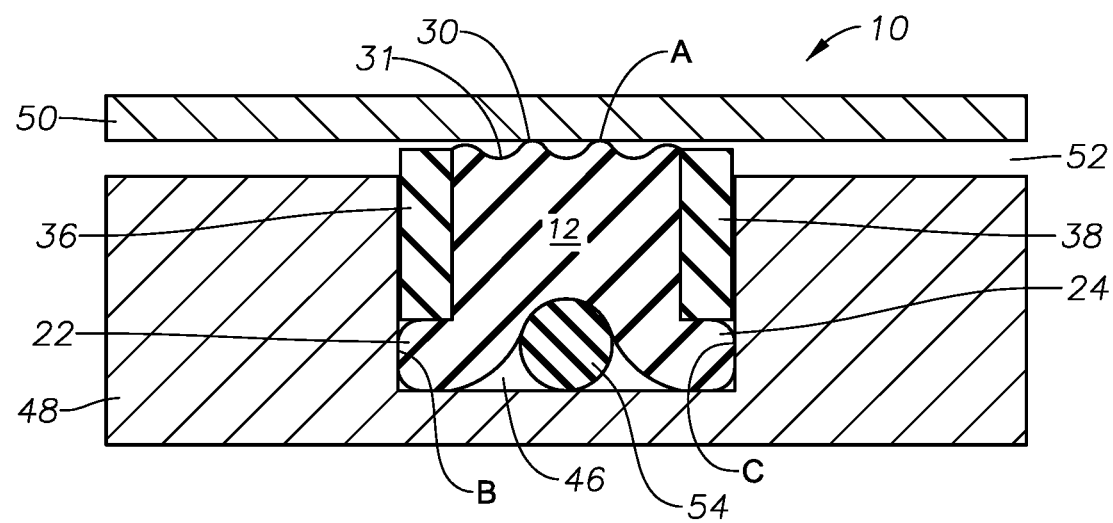
FIG. 4 shows another embodiment of a seal 10 according to this disclosure.

FIG. 4 shows another embodiment of a seal 10 according to this disclosure. An O-ring 54 may be disposed at the bottom of the seal 10, residing between the wings 22, 24. The O-ring 54 aids spread the wings 22, 24 outwardly from the seal body 12 to seal against each side of the channel 46. The present embodiment of the seal 10 may also be configured with inner 36 and outer 38 elements as shown in FIG. 1C. In addition to providing structural support, the inner 36 and outer 38 elements may reduce or prevent wear on the seal 10 edges and resist extrusion of the seal 10 from the channel 46 in applications where the first 48 and/or second 50 component is configured for movement in relation to the other component (e.g., when the installation is such that the second component 50 is configured for sliding motion (left to right in FIG. 4) over the first component 48).

Figure 5:
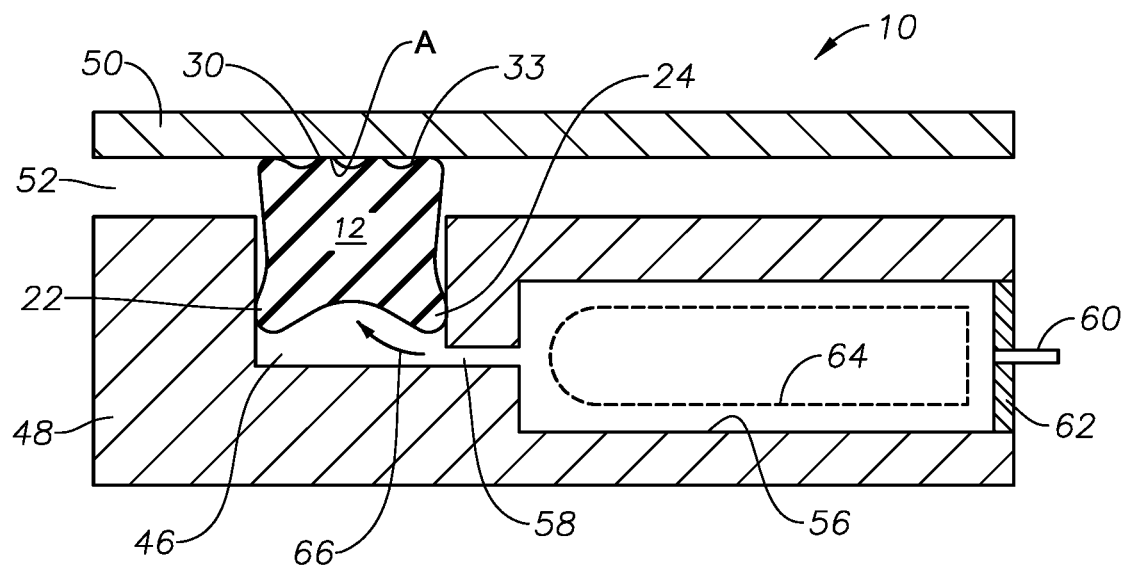
FIG. 5 shows a cross-section of another embodiment of a seal 10 according to this disclosure.

FIG. 5 shows a cross-section of another embodiment of a seal 10 according to this disclosure. A seal 10 is installed within a channel 46 between a first component 48 and a second component 50. In this embodiment, the first component 48 includes a chamber 56 formed therein and in fluid communication with the recess or channel 46 through a port 58. The chamber 56 may provide a sealed space configured to contain a fluid (e.g., nitrogen or other gas) under pressure. It will be appreciated by those skilled in the art that the chamber 56 may be formed in the first component 48 by any suitable means as known in the art (e.g., a machined cavity having a sealing end cap, by casting, by 3D printing, etc.). In some embodiments, the chamber 56 may be pressurized by injecting a suitable fluid, e.g., gas, through a nozzle 60 on a threaded end cap 62, which end cap 62 closes the chamber 56 at one end as shown in FIG. 5. In some embodiments, a pressurized gas cartridge 64 may be used to fill the chamber 56 with any desired gas as known in the art. In some embodiments, the chamber 56 may be pressurized with a suitable liquid (e.g., oil or grease). In some embodiments, a setting or curing filler compound (e.g., epoxy or thermoplastic) may be used to pressurize the chamber 56 and thereby energize the seal 10.

When the seal 10 is installed in the channel 46, the wings 22, 24 on the seal 10 extend out to simultaneously contact both sides of the channel 46. Once fluid pressure (shown by arrow 66) is applied to the space in the channel 46 underneath the seal 10 e.g., through the port 58, the seal 10 moves upward as a result of the fact that the channel 46 side walls are closed to fluid flow by the wings 22, 24 on the seal body 12. The higher the gas pressure 66, the greater the sealing forces applied to the wings 22, 24. As such, the wings 22, 24 provide that the seal 10 is pressure activated and the seal 10 is thereby energized.

As shown in FIG. 5, the raised portion(s) 30 at the top of the seal 10 also provide(s) a seal against the face A by reason of engagement with the second component 50. Sealing by the face A may also be activated by the pressurized gas 66 acting on the area beneath the seal 10 in the recess or channel 46. In embodiments such as shown in FIG. 4, the inclusion of an O-ring 54 between the wings 22, 24 may provide seal activation before fluid pressure 66 is applied, thereby providing a low-pressure sealing capability as well as higher pressure capability after fluid pressure activation of the seal 10.

Figure 6:
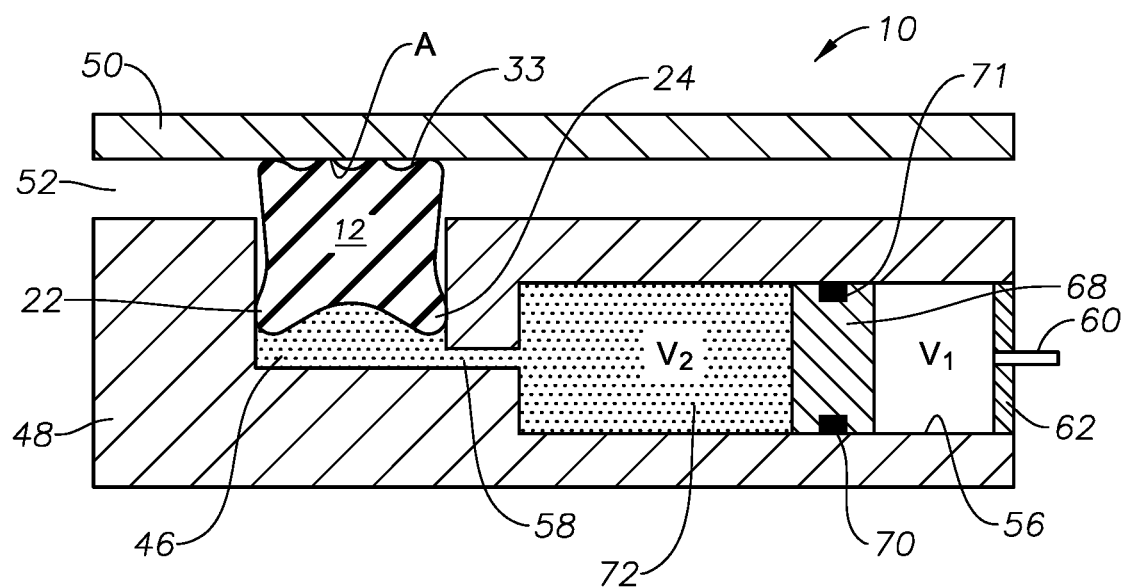
FIG. 6 shows another embodiment of a seal 10 according to this disclosure.

FIG. 6 shows another embodiment of a seal 10 according to this disclosure. The seal 10 is shown installed within a channel 46 to provide sealing between a first 48 component and a and second 50 component. As with the embodiment shown in FIG. 5, the first component 48 includes a chamber 56 in fluid communication with the channel 46 through a port 58. In the present embodiment, the chamber 56 includes a piston 68 configured to slide within the chamber 56, separating the chamber into two volumes V1, V2. With a cylindrical chamber 56, the piston 68 comprises a disc or flat cylinder having an O-ring 70 disposed in a groove 71 formed on the circumference of the piston 68. The piston 68 may be formed of any suitable material. In some embodiments, the chamber 56 may be sealed using metal-to-metal seals. Volume V1 of the chamber 56 may be pressurized by injecting a suitable fluid, e.g., gas through the nozzle 60 on the end cap 62 sealing the chamber at one end. Fluid pressure may be provided, e.g., by a pressurized gas cartridge (64 in FIG. 5), or any other suitable means as described herein. On the other side of the piston 68, volume V2 of the chamber 56 may contain a semi-solid compound 72 (e.g., suitable grease or other semi-solid compound as known in the art). The volume V2 may be pre-loaded with the compound 72 during assembly of the structure. Use of the compound 72 in volume V2 may provide an advantage in some implementations where higher pressures need to be applied to activate the seal 10 since the compound 72 is less prone to leakage than, for example, liquid or gas.

Although the seals 10 in FIGS. 5 and 6 are shown as energized (i.e., with the pressurized gas/compound acting on the space beneath the seal), the seals may also be implemented in configurations where the seals are unpressurized. A seal 10 may be placed to initially sit in the channel 46 without application of the pressurized gas 66 or compound 72. In such applications, the seal 10 provides sealing against both sides of the channel 46 through the wings 22, 24, without the face A being in contact with the second component 50. Then, at a subsequent time, fluid under pressure, e.g., the gas 66 or compound 72, can be pressurized to act on the space beneath the seal 10. Since the channel 46 sides are closed, the seal 10 will then move upward to engage the face A with the second component 50, establishing a seal on face A. It will be appreciated that the pressures placed on the face A and sides (e.g., wings 22, 24) of the seal 10 could be different depending on the implementation. Control of these pressures allows seal by the face A to be maintained as desired. It will also be appreciated by those skilled in the art that some embodiments may be configured with conventional electronics and software to automatically and autonomously pressurize the chamber 56 to energize the seals 10 to establish a face seal at face A at a desired time or under certain conditions.

Figure 7A:
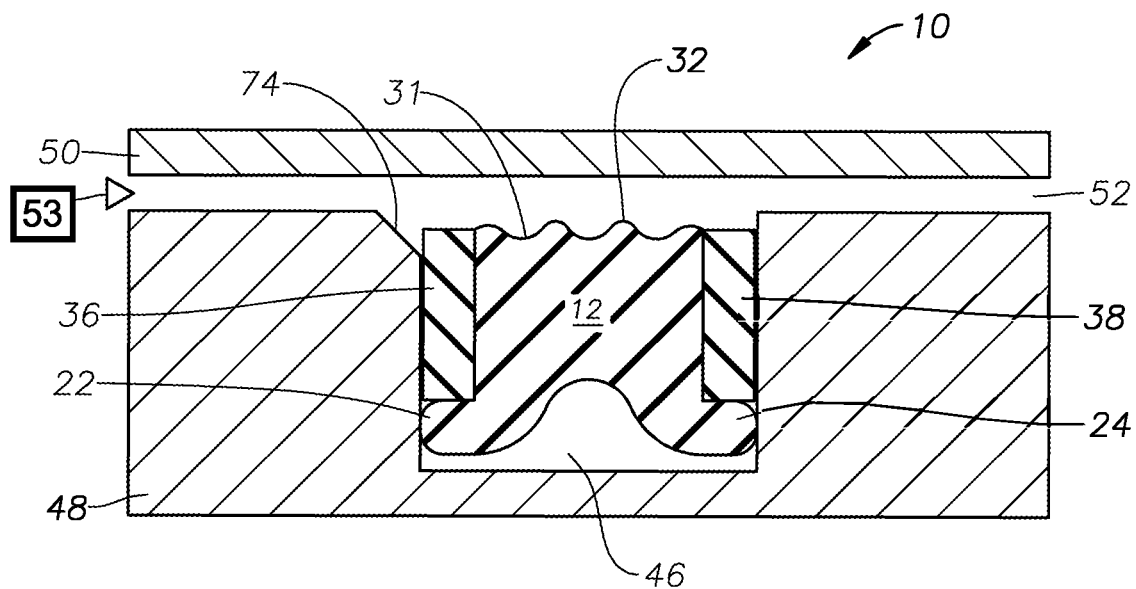
FIGS. 7A and 7B show a cross-section of another embodiment according to this disclosure.

FIG. 7A shows a cross-section of another embodiment according to this disclosure. A seal 10 is installed to sit within a channel 46 in an unpressurized state. The first component 48 is configured wherein the channel 46 has a deviated edge 74. Embodiments may be implemented with the deviated edge 74 comprising: a taper descending into the channel 46, one or more slots running along the surface of the edge, or porting formed at the edge. The deviated edge 74 can be formed on either or both sides of the channel 46. In the unactuated state, fluid pressure on the space beneath the seal 10 is equal to the fluid pressure in the separation 52 between the first 48 and second 50 components. In this implementation, a structure (not shown) comprising the first 48 and second 50 components is designed such that fluid pressure in the separation 52 undergoes a significant and rapid increase under certain conditions. Such conditions may comprise, for example, ignition of a charge 53 generating a gas expanding into the separation 52.

Figure 7B:
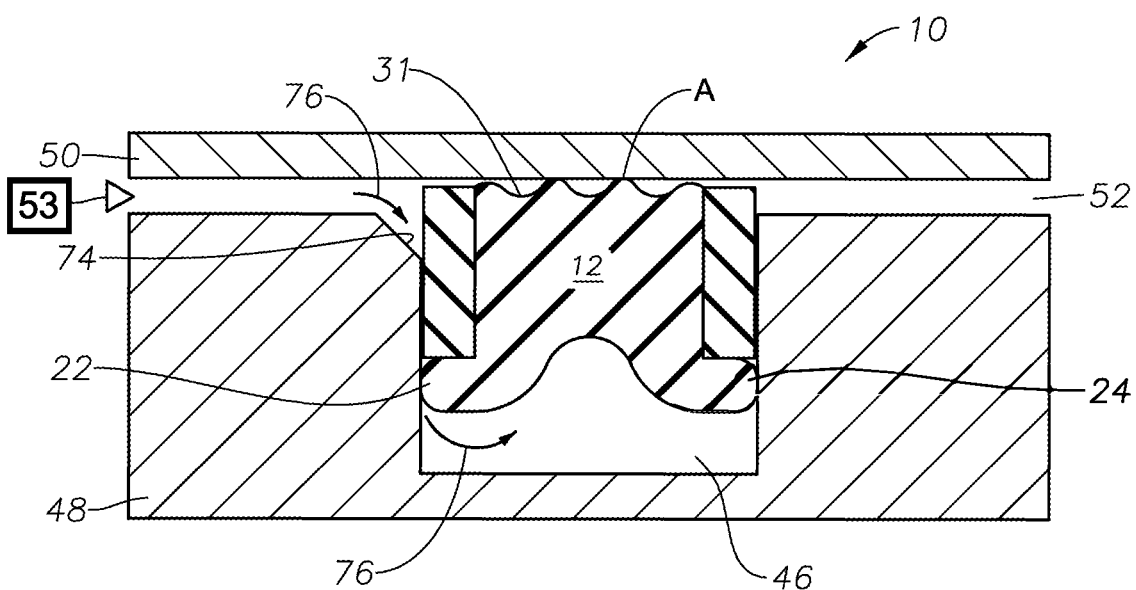

FIG. 7B shows such a high-pressure gas (arrow 76) traversing the deviated edge 74 and moving into the channel 46. The flexible wing 22 on the seal 10 permits the high-pressure gas 76 to fill space in the channel 46 beneath the seal 10. The rapid increase in gas pressure acting on the space beneath the seal 10 urges the seal 10 upward in the channel 46 to engage the seal face A against the second component 50, thereby blocking passage of the gas 76 to the other side of the seal 10. After a seal is established by energizing the seal 10, the gas pressure in the channel 46 beneath the seal 10 urges the seal 10 into contact with the second component, thereby maintaining a fluid tight seal between the first component 48 and the second component 50. Any of the disclosed seal 10 embodiments may be used as shown in FIGS. 7A and 7B for such activation by application of pressure in the passage 52.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A seal, comprising:
    a seal body formed as a closed loop configured for disposal in a channel of a first component;
    wherein the channel is configured with a first wall, a second wall, a bottom, and a void formed between the first and second walls;
    the seal body having an upper surface, a lower surface, an inner side, and an outer side;
    wherein the seal body is configured for disposal in the channel void with the seal upper surface opposite the channel bottom;
    wherein the seal upper surface is configured for exposure to a fluid under a first pressure; and
    wherein the channel is configured to receive a fluid under a second pressure greater than the first pressure at the seal lower surface to move the seal body to urge the inner side and the outer side of the seal body into sealing contact with the corresponding first wall and second wall of the channel and the seal upper surface into sealing contact with a surface of a second component positioned over the channel void.

2. The seal of claim 1 wherein the inner side and the outer side each comprise a relief, and a reinforcement is disposed in each relief.

3. The seal of claim 1 further comprising at least one reinforcement disposed in the seal body.

4. The seal of claim 3 wherein the at least one reinforcement comprises one of a ring or an annular spring.

5. The seal of claim 3 comprising two reinforcements disposed in the seal body.

6. The seal of claim 1 further comprising an O-ring disposed beneath the seal proximate the lower surface.

7. The seal of claim 1 wherein the second component is disposed near the channel void to define a passage between the second component and the channel void.

8. The seal of claim 7 wherein the passage is configured to receive the fluid under the first pressure.

9. The seal of claim 1 wherein the channel is in fluid communication with a source of fluid pressure.

10. The seal of claim 1 wherein the channel comprises a deviated edge formed on one of the first wall or the second wall to communicate the fluid under the first pressure to the channel.

11. The seal of claim 1 wherein the channel is in fluid communication with a chamber configured to contain a pressurized fluid therein.

12. A method for sealing between a first component and a second component, comprising:
    disposing a seal in a channel formed in the first component having a first wall, a second wall, a bottom, and a void formed between the first and second walls, the seal comprising a body formed as a closed loop having an upper surface, a lower surface, an inner side, and an outer side;
    the seal body disposed in the channel void with the seal upper surface opposite the channel bottom;
    exposing the seal upper surface to fluid under a first pressure; and
    introducing fluid under a second pressure greater than the first pressure at the seal lower surface to move the seal body to urge the inner side and outer side of the seal body into sealing contact with the corresponding first wall and second wall of the channel and the upper surface of the seal into sealing contact with a surface on the second component positioned over the channel void.

13. The method of claim 12 wherein introducing the fluid under the second pressure comprises introducing the fluid to a passage defined between the first component and the second component so that the fluid passes by at least one of the inner side and the outer side of the seal body to charge a space between the seal and the channel.

14. The method of claim 13 wherein the channel comprises a deviated edge to enable passage of the fluid pressure past the at least one of the inner side and the outer side of the seal body.

15. The method of claim 13 wherein the space between the seal lower surface and the channel is configured to receive a pressurized fluid originating from an actuated charge.

16. The method of claim 12 wherein the channel is in fluid communication with a chamber configured to contain a pressurized fluid therein.

17. The method of claim 12 wherein at least one of the inner side and the outer side comprises a relief, and wherein a reinforcement is disposed in the relief.

18. The method of claim 12 wherein the seal comprises at least one reinforcement disposed in the seal body.

19. A seal arrangement, comprising:
a seal body formed as a closed loop having an upper surface, a lower surface, an inner side, and an outer side;
the seal body disposed in a channel of a component,
wherein at least one of the inner side or the outer side of the seal body is in sealing contact with a corresponding wall of the channel;
wherein the channel is configured to:
a) receive a fluid to urge the seal body to slide outward from the channel;
b) release the received fluid to permit the seal body to slidingly retract into the channel; and
c) cycle between steps (a) and (b).

20. The seal arrangement of claim 19 wherein the channel is in fluid communication with a chamber configured to contain a fluid therein.

21. The seal arrangement of claim 20 further comprising a piston configured to move within the chamber to convey the fluid to the channel and allow receipt of the fluid released from the channel within the chamber.

22. The seal arrangement of claim 20 further comprising a movable piston disposed within the chamber and configured to alter a volume within the chamber to allow receipt of the fluid released from the channel.

23. The seal arrangement of claim 20 further comprising a movable piston disposed within the chamber and configured to provide the fluid to the channel under pressure.

24. The seal arrangement of claim 19 further comprising an elastomer disposed in the channel proximate the lower surface of the seal.

25. The seal arrangement of claim 19 further comprising at least one reinforcement disposed on the seal body.

* * * * *